(No Model.) 2 Sheets—Sheet 1.
G. H. HILL.
SUNSHADE FOR BICYCLES OR OTHER VEHICLES.
No. 494,333. Patented Mar. 28, 1893.
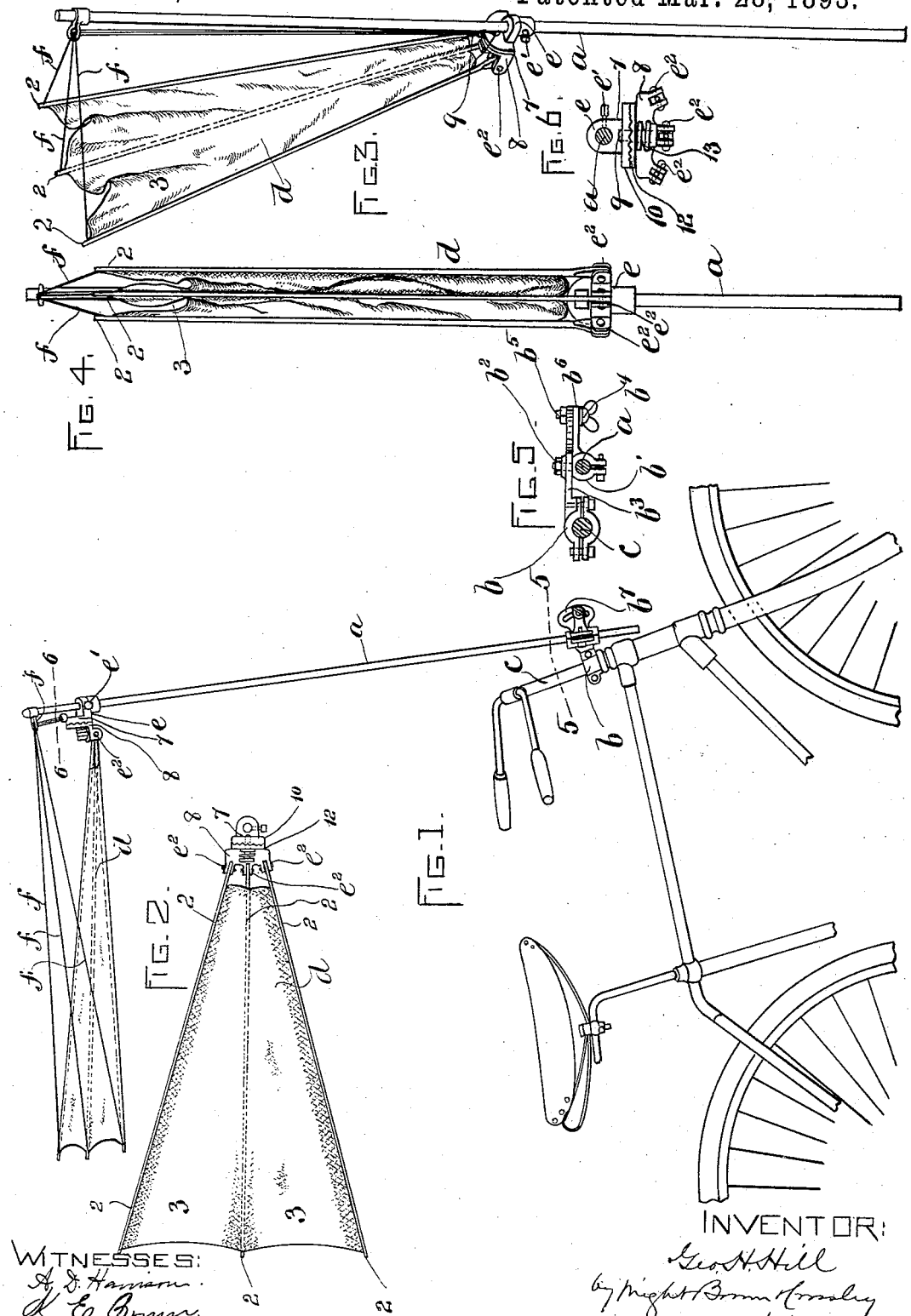
WITNESSES:
INVENTOR:
Geo. H. Hill
by Wright Brown Crosley
Attys.
THE NORRIS PETERS CO., PHOTO-LITHO., WASHINGTON, D. C.

(No Model.) 2 Sheets—Sheet 2.
G. H. HILL.
SUNSHADE FOR BICYCLES OR OTHER VEHICLES.
No. 494,333. Patented Mar. 28, 1893.
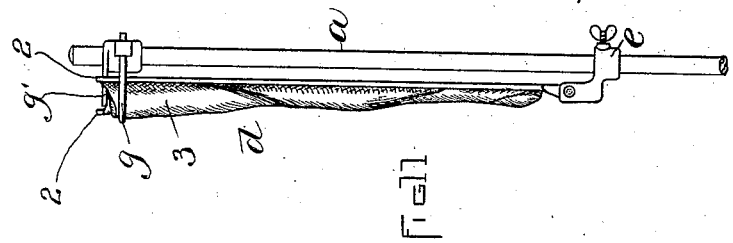
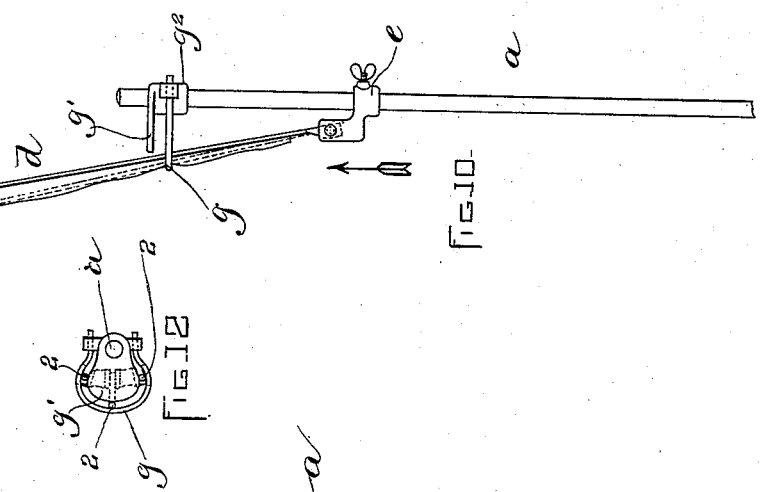
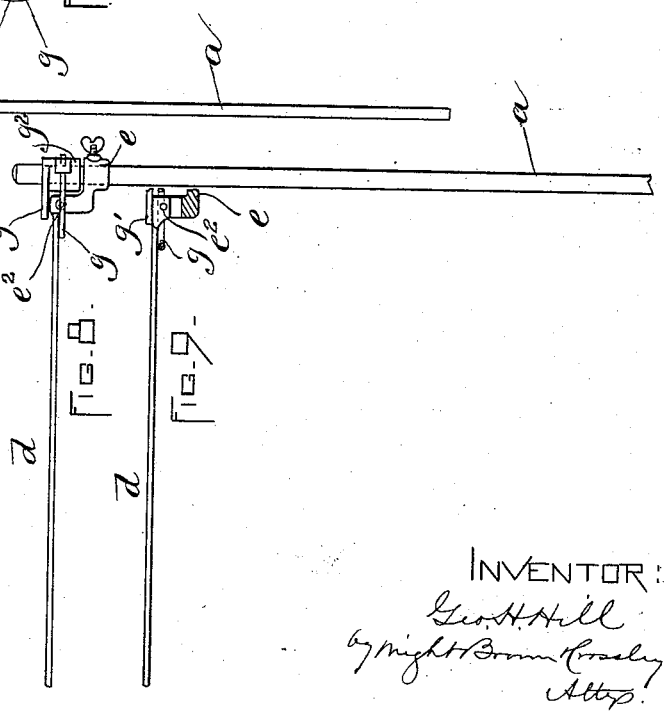
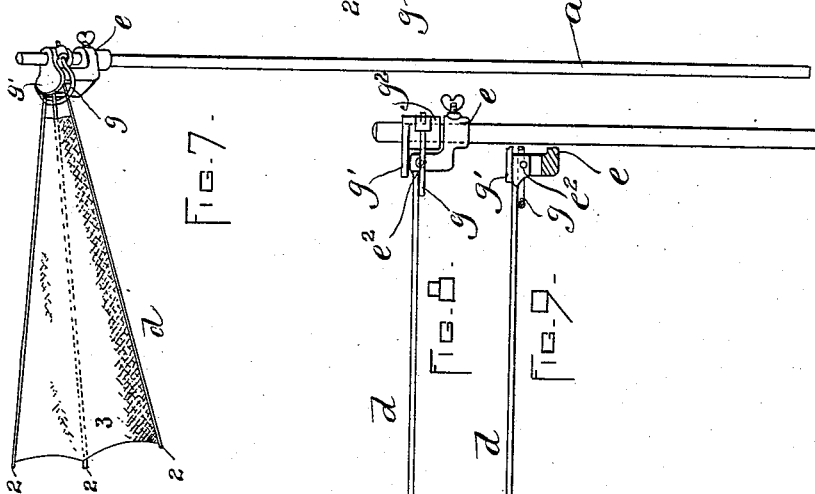
WITNESSES:
A. D. Harrison
L. E. Brown
INVENTOR:
Geo. H. Hill
by Wright Brown Crosley
Attys.

UNITED STATES PATENT OFFICE.

GEORGE H. HILL, OF READING, MASSACHUSETTS.

SUNSHADE FOR BICYCLES OR OTHER VEHICLES.

SPECIFICATION forming part of Letters Patent No. 494,333, dated March 28, 1893.

Application filed July 19, 1892. Serial No. 440,450. (No model.)

*To all whom it may concern:*

Be it known that I, GEORGE H. HILL, of Reading, in the county of Middlesex and State of Massachusetts, have invented certain new and useful Improvements in Sunshades for Bicycles or other Vehicles, of which the following is a specification.

This invention has for its object to provide a sunshade, particularly adapted for bicycles, which shall be light, capable of being compactly folded when not in use, and adapted when applied to a bicycle not only to shield the rider from the sun, but also to present the minimum of resistance to the air, so that the motion of the vehicle will not be materially retarded in consequence of the presence of the shade upon it.

To these ends the invention consists in the improvements which I will now proceed to describe and claim.

Of the accompanying drawings forming a part of this specification, Figure 1 represents a side view of a portion of a bicycle provided with a sunshade embodying my invention, the shade being shown as somewhat tilted laterally to show its top surface. Fig. 2 represents a top view of the shade. Fig. 3 represents a perspective view showing the shade partly folded. Fig. 4 represents a side view showing the shade entirely folded. Fig. 5 represents a section on line 5, 5, Fig. 1. Fig. 6 represents a section on line 6, 6, Fig. 1. Fig. 7 represents a perspective view of the shade showing the preferred construction. Fig. 8 represents a side view of the construction shown in Fig. 7. Fig. 9 represents a modification of the construction shown in Fig. 8. Figs. 10 and 11 represent side views, the former showing the shade partly and the latter wholly folded. Fig. 12 represents a top view the shade being folded as shown in Fig. 10.

The same letters and numerals of reference indicate the same parts in all the figures.

In carrying out my invention I provide a standard $a$ adapted for attachment to a suitable part of a bicycle in advance of the seat, a suitable part being the handle bar $c$. As here shown the standard is provided at its lower portion with a clamp $b$ formed to be detachably applied to the handle bar $c$.

$d$ represents a shade which is substantially triangular and when in use projects from one side of the standard, its apex being at its inner end. The shade may be engaged with the standard by any suitable means preferably as hereinafter described, and when in its operative position stands substantially at right angles with the standard. It will be seen that the location of the shade at one side of the standard, and its substantially triangular form, its apex or narrower end being next the standard enable the shade to not only afford a substantial protection for the rider of a bicycle when the standard is located as shown in Fig. 1, but also prevents any material resistance by the shade to the progress of the bicycle, because the shade is flat, is disposed so that it moves edgewise, and has its apex at its forward end, so that the shade acts as a wedge in displacing the air when the vehicle is in motion.

I believe that a substantially triangular wedge shaped shade supported by a standard having means for attachment to the frame of a bicycle or other vehicle, the shade being arranged so that its apex or narrower end is nearest the standard, is new, and I do not therefore limit myself to the means here shown and hereinafter described, for engaging the shade with the standard and for connecting the standard with a bicycle.

I consider it preferable in all cases for bicycle use, to so construct the shade as that it can be folded compactly beside or against the standard when not in use, also to provide a shade sustaining device engaged with the standard and adapted to maintain the shade in a position at right angles to the standard when the shade is required for use, and to permit the ready folding or furling of the shade.

Referring to Figs. 1 to 6, inclusive, $e$ represents a runner adapted to slide upon the standard $a$ and to be secured to the standard at any point desired by means of a set screw $e'$. The runner is provided with ears $e^2$ which are pivotally connected to the inner ends of ribs 2, 2 which support the piece of cloth 3; said ribs 2 and cloth 3 constituting the shade, the general shape of which is triangular, as shown in Figs. 2 and 7. In using the term "triangular" I do not mean that the shade constitutes an absolute triangle, the term being intended to express the idea that the shade is very narrow at its forward end and is much wider at a distance from said end, its sides diverging from the narrower end, which is nearest the standard. The ears $e^2$ are preferably arranged somewhat radially, as shown in Fig. 2, so that when the ribs stand in a substantially horizontal position they will diverge, and when they are swung upwardly to a vertical position they will come together and become substantially parallel, as shown in Fig. 4. The sustaining device which is engaged with the standard and sustains the shade in its operative position, is, in the construction shown in Figs. 1, 2, 3 and 4, composed of a series of cords $f f f$, each attached at its inner end to the runner and at its outer end to the outer end of one of the ribs; said cords passing through the eye or guide $f'$ affixed to the upper end of the standard $a$, the cords being adapted to slide freely through said eye. It will be seen that when the runner is moved downwardly upon the standard $a$ the cords $f$, sliding through the eye $f'$, draw the outer ends of the ribs inwardly toward the standard, as indicated in Fig. 3, so that when the runner is depressed to the position shown in Fig. 4, the ribs stand substantially parallel with each other and with the standard, the shade being thus compactly folded. When the runner is raised as shown in Fig. 1, the cords slide upwardly through the eye and permit the ribs to swing outwardly from the standard until they stand substantially at right angles therewith, the cords sustaining the shade in its operative position.

In the construction shown in the figures above mentioned, the runner is preferably made in two sections 7 and 8; the section 8 being the part that has the ears $e^2$ formed upon it, while the section 7 is the part that embraces and slides upon the standard $a$. The two sections are connected by a horizontal stud or pivot 9 (Fig. 6) which permits the section 8 to be turned on the horizontal axis, so that the shade may be laterally inclined or depressed at one edge and raised at the opposite edge, if desired. The section 8 may be held at any position to which it may be adjusted by means of serrated seats 10, 12 formed on the section 7, 8; said seats being held yieldingly pressed together by means of a spring 13 interposed between the section 8 and a head or shoulder on the pivot 9; said pivot being rigidly affixed to the section 7 while the section 8 is adapted to turn freely on it. The clamp $b$ that connects the standard $a$ to the handle bar $c$ may be jointed and adapted to be adjusted so that the standard will assume any desired position or inclination. As shown in Figs. 1 and 5, said clamp is composed of a compressible portion, embracing the bar $c$ and a socket $b'$ connected by a pivot $b^2$ to an arm $b^3$ on the clamp; said socket $b'$ being adapted to turn upon the pivot $b^2$ to give the standard any desired inclination forward or backward and hold it at any position to which it may be adjusted by means of a thumb nut $b^4$ on a bolt $b^5$ which passes through an arm $b^6$ affixed to the clamp $b'$ and a segmental slot $b^7$ formed in the outer end of the arm $b^3$.

In the construction shown in Figs. 7 to 12, inclusive, the shade is constructed and connected to the runner substantially as above described; but in this case the device that sustains the shade in its operative position is composed of two parts, one of which is the eye or guide $g$, which is composed of a loop of wire rigidly affixed to the standard $a$ and projecting laterally therefrom, and a laterally projecting flange or stop $g'$ located above the guide $g$ and made of less external area than said guide. The form of the guide and of the stop is such that when the runner $e$ is depressed, as shown, in Fig. 11, the ribs stand vertically in the space between the outer edge of the stop $g'$ and the inner edge of the guide $g$, said space being sufficient to permit the shade to slide lengthwise in either direction. When the runner is raised, the ribs, bearing against the guide $g$, gradually swing outward, as shown in Fig. 10 in which the runner is supposed to be moving in the direction of the arrow. When the runner is raised so that the ears to which the ribs are pivoted strike the stop $g'$, the ribs rise upon the upper edge of the guide $g$ and are supported thereby substantially at right angles with the standard, as shown in Figs. 7, 8 and 9, the stop $g'$ co-operating with the guide $g$ in supporting the shade in the last described position by preventing the upward movement of the runner after the shade has reached a horizontal position. The stop $g'$ and guide $g$ are preferably formed upon or affixed to sleeve or collar $g^2$, which is rigidly secured to the upper portion of the standard $a$. In the construction last described the runner is or may be made in one piece without provision for the lateral inclination of the shade, the ears to which the ribs are pivoted being extended upwardly from the portion of the runner which slides upon the standard, so that said ears can project into or through the guide $g$.

In Fig. 9 I show the ears $e^2$ as flattened at their upper ends and made somewhat shorter than in Fig. 8, thus permitting the stop $g'$ to be located somewhat nearer the guide $g$.

It is obvious that various other devices may be adopted for securing the shade to the standard and in such manner as to permit the folding of the shade against the standard, and to cause the shade to be sustained in the substantially horizontal position when in use, without departing from the spirit of my invention.

I claim—

1. In a sunshade for bicycles and other vehicles, the combination of a rod or standard adapted for attachment to a suitable part of the vehicle, and a substantially triangular or wedge shaped shade engaged with said standard at its apex, and projecting from one side of the standard substantially at right angles therewith, as set forth.

2. In a sunshade for bicycles and other vehicles, the combination of a rod or standard adapted for attachment to a suitable part of the vehicle, a runner fitted to slide on said standard, a substantially triangular shade composed of ribs pivotally connected at their inner ends to said runner, and a flexible covering attached to said ribs, and a shade sustaining device engaged with the standard, whereby the shade may be sustained in a position substantially at right angles with the standard when the runner is elevated, as set forth.

3. In a sunshade for bicycles and other vehicles, the combination of a rod or standard adapted for attachment to a suitable part of the vehicle, a runner fitted to slide on the standard, a shade composed of a series of ribs pivoted at their inner ends to the runner and a flexible covering attached to said ribs, and a shade sustaining device comprising first, a laterally projecting loop or guide affixed to the standard above the runner, and formed to permit the shade, when folded, to pass through it, and secondly, a laterally projecting stop affixed to the standard above the guide and made of less external area than the latter, whereby the shade when folded is permitted to move vertically between the guide and stop, said stop projecting over the guide so that when the shade has been passed upwardly through the guide, the stop and guide co-operate in sustaining it in its operative position, as set forth.

In testimony whereof I have signed my name to this specification, in the presence of two subscribing witnesses, this 16th day of July, A. D. 1892.

GEORGE H. HILL.

Witnesses:
  H. BROWN,
  A. D. HARRISON.